United States Patent
Chiang et al.

(10) Patent No.: US 10,055,632 B2
(45) Date of Patent: Aug. 21, 2018

(54) CAPACITIVE FINGERPRINT SENSING APPARATUS AND CAPACITIVE FINGERPRINT SENSING METHOD

(71) Applicant: Raydium Semiconductor Corporation, Hsinchu (TW)

(72) Inventors: Chang-Ching Chiang, Taichung (TW); Kun-Pei Lee, Miaoli County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 215 days.

(21) Appl. No.: 15/229,577

(22) Filed: Aug. 5, 2016

(65) Prior Publication Data
US 2017/0061194 A1 Mar. 2, 2017

Related U.S. Application Data

(60) Provisional application No. 62/210,631, filed on Aug. 27, 2015.

(51) Int. Cl.
*G06K 9/00* (2006.01)

(52) U.S. Cl.
CPC ....... *G06K 9/00026* (2013.01); *G06K 9/0002* (2013.01)

(58) Field of Classification Search
CPC .................. G06K 9/00026; G06K 9/0002
See application file for complete search history.

(56) References Cited

U.S. PATENT DOCUMENTS

| | | | | |
|---|---|---|---|---|
| 6,011,859 A * | 1/2000 | Kalnitsky | .......... | G06K 9/00053 382/100 |
| 6,392,636 B1 * | 5/2002 | Ferrari | ................ | G06F 3/03547 345/157 |
| 6,525,547 B2 * | 2/2003 | Hayes | .................. | G01D 5/2405 324/662 |
| 7,099,496 B2 * | 8/2006 | Benkley, III | ......... | G06K 9/0002 324/661 |
| 9,110,543 B1 * | 8/2015 | Dabell | .................... | G06F 3/044 |
| 2001/0012384 A1 * | 8/2001 | Kalnitsky | ............... | G06F 3/044 382/124 |
| 2012/0105081 A1 * | 5/2012 | Shaikh | ................. | G06K 9/0002 324/686 |
| 2013/0135247 A1 * | 5/2013 | Na | .......................... | G06F 21/32 345/174 |

(Continued)

*Primary Examiner* — Mia M Thomas

(57) ABSTRACT

A capacitive fingerprint sensing apparatus includes sensing electrodes, a sensing driver, and a processing module. In a self-capacitive sensing mode, the sensing driver performs self-capacitive sensing on at least one sensing electrode to obtain a first fingerprint sensing signal. In a mutual-capacitive sensing mode, the sensing driver performs mutual-capacitive sensing on at least two adjacent sensing electrodes to obtain a second fingerprint sensing signal. The processing module generates a first fingerprint pattern and a second fingerprint pattern according to the first fingerprint sensing signal and the second fingerprint sensing signal and combines the first fingerprint pattern and the second fingerprint pattern into a combined fingerprint pattern. The resolution of the combined fingerprint pattern along at least one direction is larger than that of the first fingerprint pattern and the second fingerprint pattern along the at least one direction.

38 Claims, 10 Drawing Sheets

(56) References Cited

U.S. PATENT DOCUMENTS

| | | | |
|---|---|---|---|
| 2013/0160109 A1* | 6/2013 | Klinghult | G01J 5/0025 726/19 |
| 2014/0292396 A1* | 10/2014 | Bruwer | H03K 17/955 327/517 |
| 2015/0195007 A1* | 7/2015 | He | H04B 5/0012 455/41.1 |
| 2015/0242673 A1* | 8/2015 | Singhal | G06K 9/00013 345/174 |
| 2016/0253539 A1* | 9/2016 | Shen | G01B 7/28 382/124 |

* cited by examiner

CAPACITIVE FINGERPRINT SENSING APPARATUS AND CAPACITIVE FINGERPRINT SENSING METHOD

BACKGROUND OF THE INVENTION

1. Field of the Invention

This invention relates to fingerprint sensing, especially to a capacitive fingerprint sensing apparatus and a capacitive fingerprint sensing method.

2. Description of the Prior Art

With the developing of technology, the capacitive fingerprint sensing technology can be widely used in various kinds of electronic devices, especially portable electronic devices such as smart phones, notebook PCs and tablet PCs.

However, the fingerprint sensing technology has high resolution requirement; under the IAFIS standard, the fingerprint sensing chip should have at least resolution of 500 dpi and its unit sensing area should be 50 um*50 um. Under this condition, the capacity sensed by the unit sensing area will be small and easily interfered by the noises, so that fingerprint recognition will become harder. Therefore, the invention provides a capacitive fingerprint sensing apparatus and a capacitive fingerprint sensing method to solve the above-mentioned problems.

SUMMARY OF THE INVENTION

A first preferred embodiment of the invention is a capacitive fingerprint sensing apparatus. In this embodiment, the capacitive fingerprint sensing apparatus is operated in a self-capacitive sensing mode or a mutual-capacitive sensing mode. The capacitive fingerprint sensing apparatus includes a plurality of sensing electrodes, a sensing driver and a processing module. The sensing driver is coupled to the plurality of sensing electrodes. When the capacitive fingerprint sensing apparatus is operated in the self-capacitive sensing mode, the sensing driver performs a self-capacitive sensing on at least one sensing electrode of the plurality of sensing electrodes to obtain a first fingerprint sensing signal; when the capacitive fingerprint sensing apparatus is operated in the mutual-capacitive sensing mode, the sensing driver performs a mutual-capacitive sensing on at least two adjacent sensing electrodes of the plurality of sensing electrodes to obtain a second fingerprint sensing signal. The processing module is coupled to the sensing driver and configured to generate a first fingerprint pattern and a second fingerprint pattern according to the first fingerprint sensing signal and the second fingerprint sensing signal respectively and then combine the first fingerprint pattern and the second fingerprint pattern into a combined fingerprint pattern. A resolution of the combined fingerprint pattern along at least one direction is larger than a resolution of the first fingerprint pattern along the at least one direction and a resolution of the second fingerprint pattern along the at least one direction.

In an embodiment, the sensing driver selects the at least two adjacent sensing electrodes of the plurality of sensing electrodes to form a mutual-capacitive sensing electrode set and then selects a part of the mutual-capacitive sensing electrode set as a signal transmitter and another part of the mutual-capacitive sensing electrode set as a signal receiver to sense a mutual capacitance between the signal transmitter and the signal receiver.

In an embodiment, an angle between the at least two adjacent sensing electrodes is arbitrary.

In an embodiment, the plurality of sensing electrodes has arbitrary geometries.

In an embodiment, the plurality of sensing electrodes has the same size and shape or different sizes or shapes.

In an embodiment, the plurality of sensing electrodes is arranged in a regular way.

In an embodiment, when the capacitive fingerprint sensing apparatus is operated in the self-capacitive sensing mode, the sensing driver combines N sensing electrodes of the plurality of sensing electrodes as a self-capacitive sensing electrode set to perform the self-capacitive sensing, N is a positive integer larger than 1.

In an embodiment, sensing points on the first fingerprint pattern obtained by the sensing driver performing the self-capacitive sensing correspond to a sensing gravity center of the self-capacitive sensing electrode set.

In an embodiment, when the capacitive fingerprint sensing apparatus is operated in the mutual-capacitive sensing mode, the sensing driver combines M1 sensing electrodes of the plurality of sensing electrodes as a signal transmitter and also combines another M2 sensing electrodes adjacent to the M1 sensing electrodes as a signal receiver to form a mutual-capacitive sensing electrode set to sense a mutual-capacitance between the signal transmitter and the signal receiver, M1 and M2 are both integers larger than 1.

In an embodiment, sensing points on the second fingerprint pattern obtained by the sensing driver performing the mutual-capacitive sensing correspond to a sensing gravity center of the mutual-capacitive sensing electrode set.

In an embodiment, when the capacitive fingerprint sensing apparatus is operated in the mutual-capacitive sensing mode, the sensing driver selects a sensing electrode of the plurality of sensing electrodes as a signal transmitter and combines another M3 sensing electrodes adjacent to the sensing electrode as a signal receiver to form a mutual-capacitive sensing electrode set to sense a mutual-capacitance between the signal transmitter and the signal receiver, sensing points on the second fingerprint pattern obtained by the sensing driver performing the mutual-capacitive sensing correspond to a sensing gravity center of the mutual-capacitive sensing electrode set, M3 is an integer larger than 1.

In an embodiment, when the capacitive fingerprint sensing apparatus is operated in the mutual-capacitive sensing mode, the sensing driver selects a sensing electrode of the plurality of sensing electrodes as a signal receiver and combines another M4 sensing electrodes adjacent to the sensing electrode as a signal transmitter to form a mutual-capacitive sensing electrode set to sense a mutual-capacitance between the signal transmitter and the signal receiver, sensing points on the second fingerprint pattern obtained by the sensing driver performing the mutual-capacitive sensing correspond to a sensing gravity center of the mutual-capacitive sensing electrode set, M4 is an integer larger than 1.

In an embodiment, sensing points of the first fingerprint pattern and sensing points of the second fingerprint pattern are interlaced to make the resolution of the combined fingerprint pattern larger than the resolution of the first fingerprint pattern or the resolution of the second fingerprint pattern.

In an embodiment, the first fingerprint pattern and the second fingerprint pattern have different resolutions along different directions.

In an embodiment, the combined fingerprint pattern has different resolutions along different directions.

In an embodiment, when the capacitive fingerprint sensing apparatus is operated in the self-capacitive sensing mode, sensing electrodes around the at least one sensing electrode performing the self-capacitive sensing can receive a fixed DC voltage, a ground voltage, a variable AC voltage or a sensing related signal to reduce interference on fingerprint sensing.

In an embodiment, when the capacitive fingerprint sensing apparatus is operated in the mutual-capacitive sensing mode, sensing electrodes around the at least two sensing electrodes performing the mutual-capacitive sensing can receive a fixed DC voltage, a ground voltage, a variable AC voltage or a sensing related signal to reduce interference on fingerprint sensing.

In an embodiment, the capacitive fingerprint sensing apparatus includes a switching module coupled between the sensing driver and the processing module and configured to selectively switch to the self-capacitive sensing mode or the mutual-capacitive sensing mode and transmit the first fingerprint sensing signal and the second fingerprint sensing signal to the processing module.

In an embodiment, the capacitive fingerprint sensing apparatus includes an amplifying module coupled between the switching module and the processing module and configured to amplify the first fingerprint sensing signal and the second fingerprint sensing signal and then transmit the amplified first fingerprint sensing signal and second fingerprint sensing signal to the processing module.

A second preferred embodiment of the invention is a capacitive fingerprint sensing method. In this embodiment, the capacitive fingerprint sensing method is applied to a capacitive fingerprint sensing apparatus operated in a self-capacitive sensing mode or a mutual-capacitive sensing mode, the capacitive fingerprint sensing apparatus comprising a plurality of sensing electrodes and a sensing driver. The capacitive fingerprint sensing method includes steps of: (a) when the capacitive fingerprint sensing apparatus is operated in the self-capacitive sensing mode, the sensing driver performing a self-capacitive sensing on at least one sensing electrode of the plurality of sensing electrodes to obtain a first fingerprint sensing signal; (b) when the capacitive fingerprint sensing apparatus is operated in the mutual-capacitive sensing mode, the sensing driver performing a mutual-capacitive sensing on at least two adjacent sensing electrodes of the plurality of sensing electrodes to obtain a second fingerprint sensing signal; and (c) generating a first fingerprint pattern and a second fingerprint pattern according to the first fingerprint sensing signal and the second fingerprint sensing signal respectively and then combining the first fingerprint pattern and the second fingerprint pattern into a combined fingerprint pattern; wherein a resolution of the combined fingerprint pattern along at least one direction is larger than a resolution of the first fingerprint pattern along the at least one direction and a resolution of the second fingerprint pattern along the at least one direction.

Compared to the prior art, the capacitive fingerprint sensing apparatus and capacitive fingerprint sensing method of the invention perform fingerprint sensing through self-capacitive sensing technology and mutual-capacitive sensing technology respectively and combine the self-capacitive fingerprint pattern and the mutual-capacitive fingerprint pattern into a combined fingerprint pattern. Therefore, the capacitive fingerprint sensing apparatus and capacitive fingerprint sensing method of the invention can effectively increase the capacity sensed by the unit sensing electrode without decreasing its high resolution. As a result, not only the noise interference can be reduced to increase the accuracy of fingerprint recognition, but also the number of signal traces can be also reduced to simplify the circuit structure and save the chip area.

The advantage and spirit of the invention may be understood by the following detailed descriptions together with the appended drawings.

BRIEF DESCRIPTION OF THE APPENDED DRAWINGS

FIG. 1 illustrates a schematic diagram of the capacitive fingerprint sensing apparatus of the invention.

FIG. 2A~FIG. 2D illustrate the plurality of sensing electrodes, the first fingerprint pattern obtained in the self-capacitive sensing mode, the second fingerprint pattern obtained in the mutual-capacitive sensing mode and the combined fingerprint pattern obtained by combining the first fingerprint pattern and the second fingerprint pattern respectively in the first embodiment of the invention.

FIG. 3A~FIG. 3D illustrate the plurality of sensing electrodes, the first fingerprint pattern obtained in the self-capacitive sensing mode, the second fingerprint pattern obtained in the mutual-capacitive sensing mode and the combined fingerprint pattern obtained by combining the first fingerprint pattern and the second fingerprint pattern respectively in the second embodiment of the invention.

FIG. 4A~FIG. 4D illustrate the plurality of sensing electrodes, the first fingerprint pattern obtained in the self-capacitive sensing mode, the second fingerprint pattern obtained in the mutual-capacitive sensing mode and the combined fingerprint pattern obtained by combining the first fingerprint pattern and the second fingerprint pattern respectively in the third embodiment of the invention.

FIG. 5A~FIG. 5B illustrate arrangements of sensing electrodes having different shapes and sizes respectively.

DETAILED DESCRIPTION OF THE INVENTION

A preferred embodiment of the invention is a capacitive fingerprint sensing apparatus. In this embodiment, the capacitive fingerprint sensing apparatus of the invention can be operated in the self-capacitive sensing mode or the mutual-capacitive sensing mode; it uses the self-capacitive sensing technology to perform a fingerprint sensing and uses the mutual-capacitive sensing technology to perform another fingerprint sensing respectively, and then the capacitive fingerprint sensing apparatus combines the self-capacitive fingerprint pattern and the mutual-capacitive fingerprint pattern into a combined fingerprint pattern. Since the self-capacitive sensing points in the first fingerprint pattern and the mutual-capacitive sensing points in the second fingerprint pattern are interlaced, the resolution of the combined fingerprint pattern along at least one direction will be larger than the resolution of the first fingerprint pattern and the second fingerprint pattern along the at least one direction.

Figure 1:
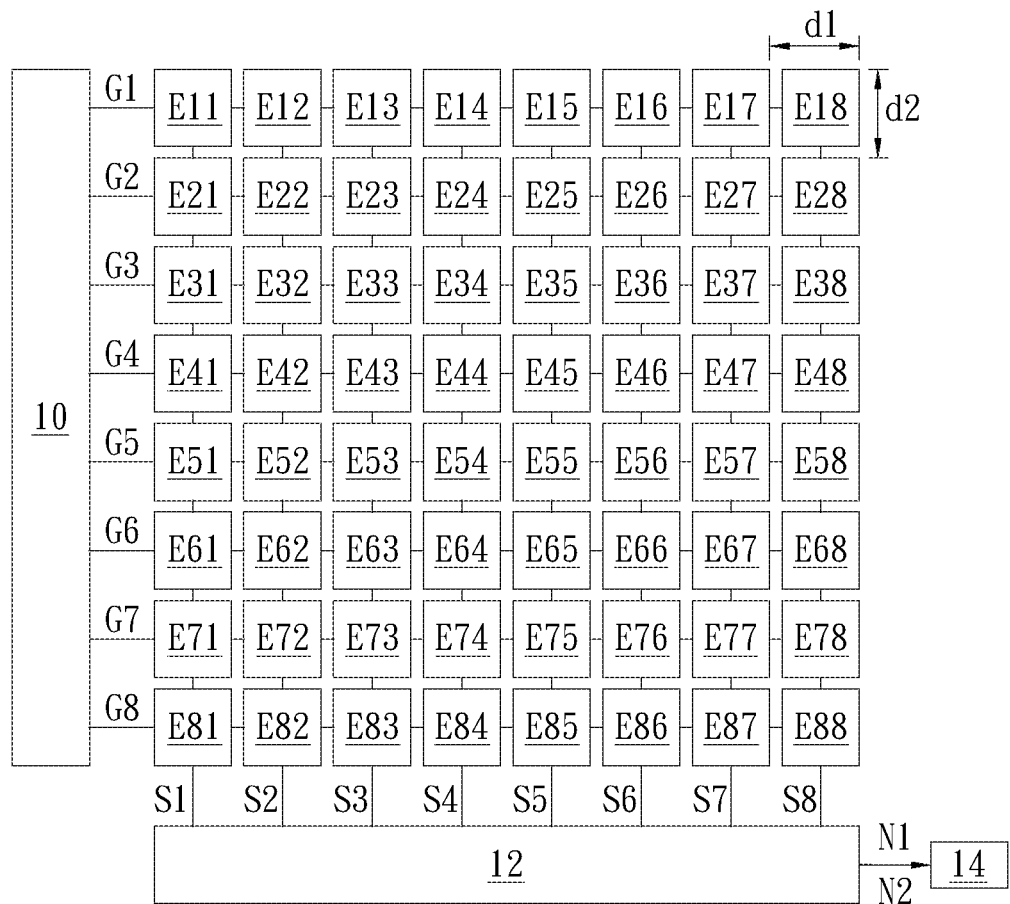

At first, please refer to FIG. 1. FIG. 1 illustrates a schematic diagram of the capacitive fingerprint sensing apparatus of the invention. As shown in FIG. 1, the capacitive fingerprint sensing apparatus 1 includes sensing electrodes E11~E88, a scanning driver 10, a sensing driver 12 and a processing module 14. Wherein, the sensing electrodes E11~E88 are arranged in a form of (8*8) matrix, but not limited to this. In the horizontal direction, the (8*8) matrix includes a first row of sensing electrodes E11~E18, a second row of sensing electrodes E21~E28, . . . , and an eighth row of sensing electrodes E81~E88; in the vertical direction, the (8*8) matrix includes a first column of sensing electrodes E11~E81, a second column of sensing electrodes E12~E82, . . . , and an eighth column of sensing electrodes E18~E88.

The scanning driver 10 is coupled to the first row of sensing electrodes E11~E18, the second row of sensing electrodes E21~E28, and the eighth row of sensing electrodes E81~E88 through scanning lines G1~G8 respectively; the sensing driver 12 is coupled to the first column of sensing electrodes E11~E81, the second column of sensing electrodes E12~E82, . . . , and the eighth column of sensing electrodes E18~E88 through sensing lines S1~S8 respectively.

For each row of sensing electrodes, there is a first distance d1 between two adjacent sensing electrodes (e.g., the sensing electrodes E11 and E12); for each column of sensing electrodes, there is a second distance d2 between two adjacent sensing electrodes (e.g., the sensing electrodes E11 and E21). In fact, the first distance d1 and the second distance d2 can be the same or different without any specific limitations. In addition, there is a third distance d3 between any two sensing electrodes (e.g., the sensing electrodes E12 and E21) adjacent to a 45 degree angle.

In this embodiment, the scanning driver 10 will perform a scanning on the first row of sensing electrodes E11~E18, the second row of sensing electrodes E21~E28, . . . , and the eighth row of sensing electrodes E81~E88 through the scanning lines G1~G8 respectively; the sensing driver 12 will perform a sensing on the first column of sensing electrodes E11~E81, the second column of sensing electrodes E12~E82, . . . , and the eighth column of sensing electrodes E18~E88 through sensing lines S1~S8 respectively.

It should be noticed that when the capacitive fingerprint sensing apparatus 1 is operated in the self-capacitive sensing mode, the sensing driver 12 will select at least one sensing electrode of the sensing electrodes E11~E88 to perform the self-capacitive sensing to obtain a first fingerprint sensing signal (namely the self-capacitive fingerprint sensing signal) N1; when the capacitive fingerprint sensing apparatus 1 is operated in the mutual-capacitive sensing mode, the sensing driver 12 will select at least two adjacent sensing electrodes of the sensing electrodes E11~E88 to perform mutual-capacitive sensing to obtain a second fingerprint sensing signal (namely the mutual-capacitive fingerprint sensing signal) N2.

Then, when the processing module 14 receives the first fingerprint sensing signal N1 and the second fingerprint sensing signal N2 from the sensing driver 12 respectively, the processing module 14 will obtain a first fingerprint pattern P1 and a second fingerprint pattern P2 according to the first fingerprint sensing signal N1 and the second fingerprint sensing signal N2 respectively and combine the first fingerprint pattern P1 and the second fingerprint pattern P2 into a combined fingerprint pattern P3. In practical applications, the first fingerprint pattern P1 and the second fingerprint pattern P2 can have the same resolution or different resolutions along different directions, and the combined fingerprint pattern P3 can have the same resolution or different resolutions along different directions without any specific limitations.

It should be noticed that because the self-capacitive sensing points in the first fingerprint pattern P1 and the mutual-capacitive sensing points in the second fingerprint pattern P2 are interlaced, the resolution of the combined fingerprint pattern P3 along at least one direction will be larger than the resolution of the first fingerprint pattern P1 and the second fingerprint pattern P2 along the at least one direction. In fact, the at least one direction mentioned above can be the horizontal direction, the vertical direction, the direction of 45° angle or any other directions without any specific limitations.

In addition, when the capacitive fingerprint sensing apparatus 1 is operated in the self-capacitive sensing mode, the sensing electrodes around the at least one sensing electrode performing self-capacitive sensing can receive a fixed DC voltage, a ground voltage, a variable AC voltage or a sensing related signal to reduce interference on fingerprint sensing; when the capacitive fingerprint sensing apparatus 1 is operated in the mutual-capacitive sensing mode, the sensing electrodes around the at least two adjacent sensing electrodes performing mutual-capacitive sensing can receive a fixed DC voltage, a ground voltage, a variable AC voltage or a sensing related signal to reduce interference on fingerprint sensing.

Then, the first embodiment of the invention will be introduced in detail as follows.

Please refer to FIG. 2A~FIG. 2D. FIG. 2A~FIG. 2D illustrate the plurality of sensing electrodes, the first fingerprint pattern obtained in the self-capacitive sensing mode, the second fingerprint pattern obtained in the mutual-capacitive sensing mode and the combined fingerprint pattern obtained by combining the first fingerprint pattern and the second fingerprint pattern respectively in the first embodiment of the invention.

Figure 2A:
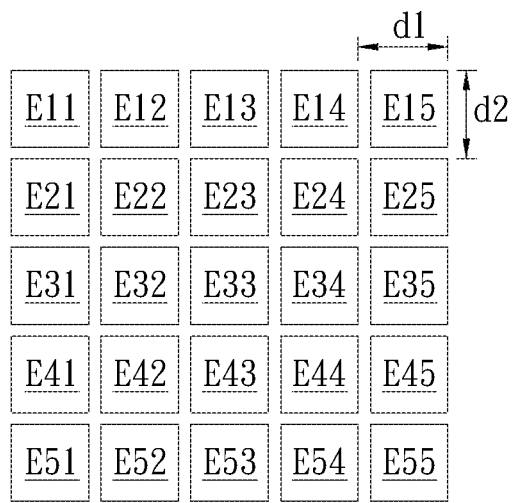

As shown in FIG. 2A, in the first embodiment of the invention, the plurality of sensing electrodes E11~E55 is arranged in a form of (5*5) matrix. In the horizontal direction, the (5*5) matrix includes a first row of sensing electrodes E11~E15, a second row of sensing electrodes E21~E25, . . . , and an fifth row of sensing electrodes E51~E55; in the vertical direction, the (5*5) matrix includes a first column of sensing electrodes E11~E51, a second column of sensing electrodes E12~E52, . . . , and an fifth column of sensing electrodes E15~E55. For each row of sensing electrodes, there is a first distance d1 between any two adjacent sensing electrodes in the same row of sensing electrodes; for each column of sensing electrodes, there is a second distance d2 between any two adjacent sensing electrodes in the same column of sensing electrodes.

Figure 2B:
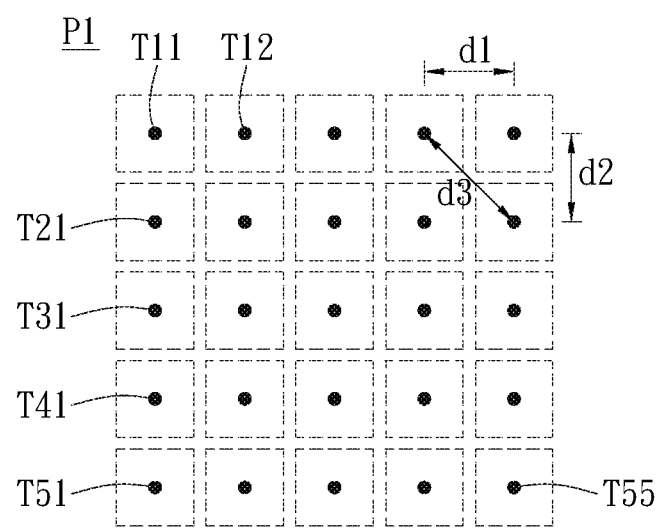

When the capacitive fingerprint sensing apparatus 1 is operated in the self-capacitive sensing mode, the sensing driver 12 will perform self-capacitive sensing on each of the sensing electrodes E11~E55 respectively to obtain a first fingerprint sensing signal N1 corresponding to self-capacitive sensing, and then the processing module 14 will generate a first fingerprint pattern P1 corresponding to self-capacitive sensing according to the first fingerprint sensing signal N1, as shown in FIG. 2B.

Referring to the first fingerprint pattern P1 illustrated in FIG. 2B, it can be found that the first fingerprint pattern P1 corresponding to self-capacitive sensing includes a plurality of self-capacitive sensing points T11~T55 corresponding to the plurality of sensing electrodes E11~E55 respectively. In this embodiment, the positions of the plurality of self-capacitive sensing points T11~T55 corresponds to a sensing gravity center of the plurality of sensing electrodes E11~E55 respectively, but not limited to this.

It should be noticed that, there is a first distance d1 between any two adjacent self-capacitive sensing points in the first fingerprint pattern P1 along the horizontal direction; there is a second distance d2 between any two adjacent self-capacitive sensing points in the first fingerprint pattern P1 along the vertical direction. As to the oblique angle direction, there is a third distance d3 between any two self-capacitive sensing points adjacent to 45° angle in the first fingerprint pattern P1.

Figure 2C:
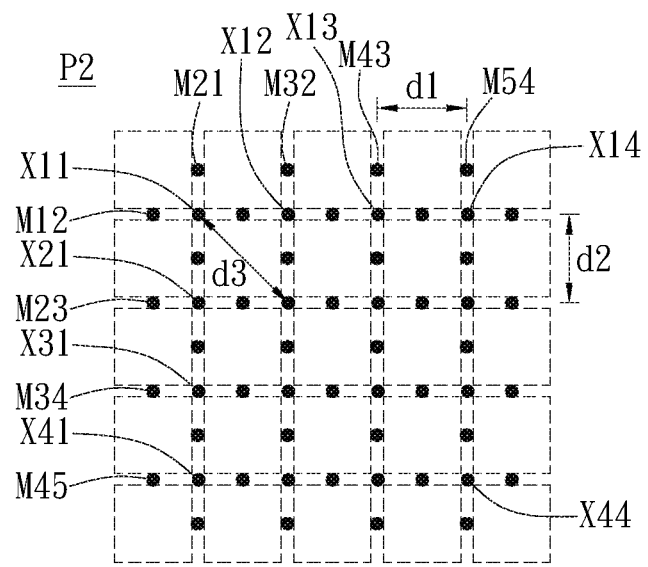

When the capacitive fingerprint sensing apparatus 1 is operated in the mutual-capacitive sensing mode, the sensing driver 12 will perform mutual-capacitive sensing on any two adjacent sensing electrodes of the sensing electrodes E11~E55 respectively to obtain the second fingerprint sensing signal N2 corresponding to mutual-capacitive sensing and then the processing module 14 will generate the second fingerprint pattern P2 corresponding to mutual-capacitive sensing according to the second fingerprint sensing signal N2, as shown in FIG. 2C.

Referring to the second fingerprint pattern P2 illustrated in FIG. 2C, it can be found that the second fingerprint pattern P2 corresponding to mutual-capacitive sensing can include a plurality of first mutual-capacitive sensing points (e.g., M12~M45), a plurality of second mutual-capacitive sensing points (e.g., M21~M54) and a plurality of third mutual-capacitive sensing points (e.g., X11~X44).

Since the plurality of first mutual-capacitive sensing points (e.g., M12~M45) is obtained by the sensing driver 12 performing mutual-capacitive sensing on any two adjacent sensing electrodes in the same column of sensing electrodes, the positions of the first mutual-capacitive sensing points will correspond to the position between the two adjacent sensing electrodes in the same column of sensing electrodes. There is a first distance d1 between any two adjacent first mutual-capacitive sensing points along the horizontal direction; there is a second distance d2 between any two adjacent first mutual-capacitive sensing points along the vertical direction.

For example, the first mutual-capacitive sensing point M12 is obtained by the sensing driver 12 performing mutual-capacitive sensing on two adjacent sensing electrodes E11 and E21 in the first column of sensing electrodes E11~E51 respectively; therefore, the position of the first mutual-capacitive sensing point M12 will correspond to the position between the two adjacent sensing electrodes E11 and E21. Similarly, the first mutual-capacitive sensing point M45 is obtained by the sensing driver 12 performing mutual-capacitive sensing on two adjacent sensing electrodes E41 and E51 in the first column of sensing electrodes E11~E51 respectively; therefore, the position of the first mutual-capacitive sensing point M45 will correspond to the position between the two adjacent sensing electrodes E41 and E51, and so on.

Since the plurality of second mutual-capacitive sensing points (e.g., M21~M54) is obtained by the sensing driver 12 performing mutual-capacitive sensing on any two adjacent sensing electrodes in the same row of sensing electrodes, the positions of the second mutual-capacitive sensing points will correspond to the position between the two adjacent sensing electrodes in the same row of sensing electrodes. There is a first distance d1 between any two adjacent second mutual-capacitive sensing points along the horizontal direction; there is a second distance d2 between any two adjacent second mutual-capacitive sensing points along the vertical direction.

For example, the second mutual-capacitive sensing point M21 is obtained by the sensing driver 12 performing mutual-capacitive sensing on two adjacent sensing electrodes E11 and E12 in the first row of sensing electrodes E11~E15 respectively; therefore, the position of the second mutual-capacitive sensing point M21 will correspond to the position between the two adjacent sensing electrodes E11 and E12. Similarly, the second mutual-capacitive sensing point M54 is obtained by the sensing driver 12 performing mutual-capacitive sensing on two adjacent sensing electrodes E14 and E15 in the first row of sensing electrodes E11~E15 respectively; therefore, the position of the second mutual-capacitive sensing point M54 will correspond to the position between the two adjacent sensing electrodes E14 and E15, and so on.

It should be noticed that the third mutual-capacitive sensing points (e.g., X11~X44) are obtained by the sensing driver 12 performing mutual-capacitive sensing on two sensing electrodes adjacent along the direction of 45° angle respectively; therefore, the location of the third mutual-capacitive sensing point will correspond to the position between the two sensing electrodes adjacent along the direction of 45° angle. There is a first distance d1 between any two adjacent third mutual-capacitive sensing points (e.g., X11 and X12) along the horizontal direction; there is a second distance d2 between any two adjacent third mutual-capacitive sensing points (e.g., X11 and X21) along the vertical direction; there is a third distance d3 between any two third mutual-capacitive sensing points (e.g., X11 and X22) adjacent along the oblique angle direction.

For example, the third mutual-capacitive sensing point X11 can be obtained by the sensing driver 12 performing mutual-capacitive sensing on the sensing electrodes E11 and E22 adjacent along the oblique angle direction respectively or obtained by the sensing driver 12 performing mutual-capacitive sensing on the sensing electrodes E12 and E21 adjacent along the oblique angle direction respectively; therefore, the position of the third mutual-capacitive sensing point X11 will correspond to the position between the sensing electrodes E11 and E22 (or the sensing electrodes E12 and E21) adjacent along the oblique angle direction. Similarly, the third mutual-capacitive sensing point X44 can be obtained by the sensing driver 12 performing mutual-capacitive sensing on the sensing electrodes E44 and E55 adjacent along the oblique angle direction respectively or obtained by the sensing driver 12 performing mutual-capacitive sensing on the sensing electrodes E45 and E54 adjacent along the oblique angle direction respectively; therefore, the position of the third mutual-capacitive sensing point X44 will correspond to the position between the sensing electrodes E44 and E55 (or the sensing electrodes E45 and E54) adjacent along the oblique angle direction, and so on.

Figure 2D:
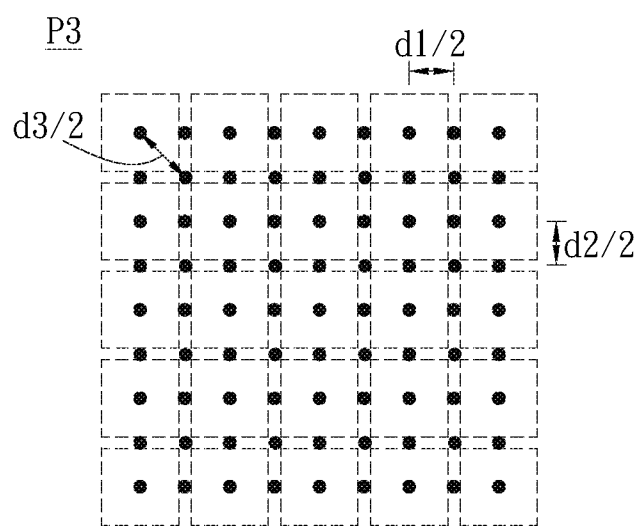

Then, the processing module 14 will combine the first fingerprint pattern P1 and the second fingerprint pattern P2 into a combined fingerprint pattern P3, as shown in FIG. 2D. Referring to the combined fingerprint pattern P3 illustrated in FIG. 2D, it can be found that the combined fingerprint pattern P3 can include the self-capacitive sensing points T11~T55 in the first fingerprint pattern P1 and the first mutual-capacitive sensing points (e.g., M12~M45), the second mutual-capacitive sensing points (e.g., M21~M54) and the third mutual-capacitive sensing points (e.g., X11~X44).

Therefore, the distance between any two adjacent sensing points (e.g., the self-capacitive sensing point T11 and the second mutual-capacitive sensing point M21) along the horizontal direction in the combined fingerprint pattern P3 is half of the first distance d1, namely d1/2; the distance between any two adjacent sensing points (e.g., the self-capacitive sensing point T11 and the first mutual-capacitive sensing point M12) along the vertical direction in the combined fingerprint pattern P3 is half of the second distance d2, namely d2/2; the distance between any two adjacent sensing points (e.g., the self-capacitive sensing point T11 and the third mutual-capacitive sensing point X11) along the oblique angle direction in the combined fingerprint pattern P3 is half of the third distance d3, namely d3/2.

From above, it can be known that, compared to the first fingerprint pattern P1 and the second fingerprint pattern P2, the combined fingerprint pattern P3 has higher resolution along at least one direction (e.g., the horizontal direction, the vertical direction, the oblique angle direction of 45° or any other directions) than the resolution of the first fingerprint pattern P1 and the second fingerprint pattern P2 along the at least one direction; therefore, the combined fingerprint pattern P3 obtained by the capacitive fingerprint sensing apparatus 1 can still maintain high resolution without reducing its resolution.

Please refer to FIG. 3A~FIG. 3D. FIG. 3A~FIG. 3D illustrate the plurality of sensing electrodes, the first fingerprint pattern obtained in the self-capacitive sensing mode, the second fingerprint pattern obtained in the mutual-capacitive sensing mode and the combined fingerprint pattern obtained by combining the first fingerprint pattern and the second fingerprint pattern respectively in the second embodiment of the invention.

Figure 3A:
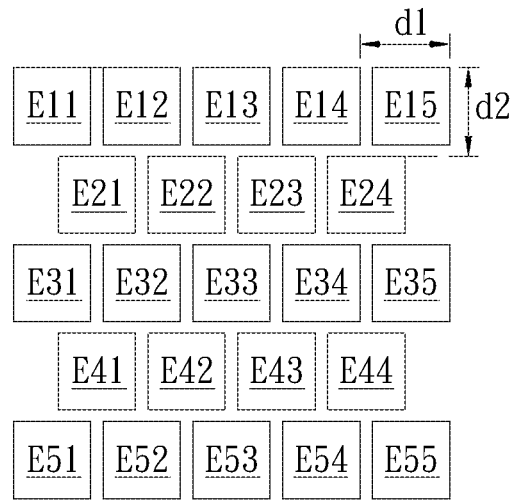

As shown in FIG. 3A, in the second embodiment of the invention, the plurality of sensing electrodes E11~E55 are interlaced instead of being arranged in a form of matrix. In the horizontal direction, the plurality of sensing electrodes E11~E55 includes a first row of sensing electrodes E11~E15, a second row of sensing electrodes E21~E25, . . . , and an fifth row of sensing electrodes E51~E55, and there is a first distance d1 between any two adjacent sensing electrodes in every row of sensing electrodes; in the vertical direction, the first row of sensing electrodes E11~E15, the third row of sensing electrodes E31~E35 and the fifth row of sensing electrodes E51~E55 are aligned, and the second row of sensing electrodes E21~E24 and the fourth row of sensing electrodes E41~E44 are aligned.

Wherein, the center position of each sensing electrode of the second row of sensing electrodes E21~E24 correspond to the position between any two sensing electrodes of the first row of sensing electrodes E11~E15 and the position between any two sensing electrodes of the third row of sensing electrodes E31~E35 respectively. Similarly, the center position of each sensing electrode of the fourth row of sensing electrodes E41~E44 correspond to the position between any two sensing electrodes of the third row of sensing electrodes E31~E35 and the position between any two sensing electrodes of the fifth row of sensing electrodes E51~E55 respectively. For example, the horizontal distance between the sensing electrode E21 of the second row of sensing electrodes E21~E24 and the sensing electrode E11 of the first row of sensing electrodes E11~E15 is half of the first distance d1, namely (d1)/2.

Figure 3B:
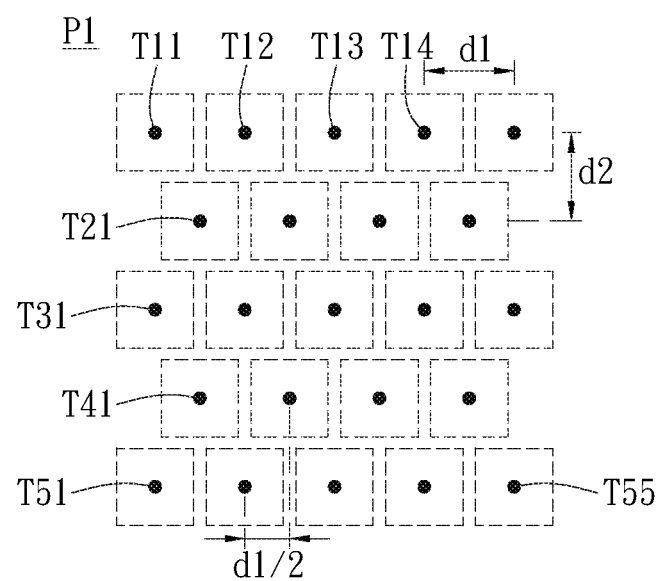

When the capacitive fingerprint sensing apparatus 1 is operated in the self-capacitive sensing mode, the sensing driver 12 will perform self-capacitive sensing on each of the sensing electrodes E11~E55 to obtain the first fingerprint sensing signal N1 corresponding to self-capacitive sensing, and then the processing module 14 will generate the first fingerprint pattern P1 corresponding to self-capacitive sensing according to the first fingerprint sensing signal N1, as shown in FIG. 3B.

From the first fingerprint pattern P1 shown in FIG. 3B, it can be found that the first fingerprint pattern P1 corresponding to self-capacitive sensing includes a plurality of self-capacitive sensing points T11~T55 and the plurality of self-capacitive sensing points T11~T55 corresponds to the plurality of sensing electrodes E11~E55 respectively. In this embodiment, the positions of the self-capacitive sensing points T11~T55 will correspond to the centers of the sensing electrodes E11~E55 respectively; therefore, the self-capacitive sensing points T11~T55 will be interlaced, but not limited to this.

In the horizontal direction, the self-capacitive sensing points T11~T55 includes a first row of self-capacitive sensing points T11~T15, a second row of self-capacitive sensing points T21~T24, a third row of self-capacitive sensing points T31~T35, a fourth row of self-capacitive sensing points T41~T44 and a fifth row of sensing electrodes T51~T55; for each row of self-capacitive sensing points, there is the first distance d1 between any two adjacent self-capacitive sensing points. In the vertical direction, the first row of self-capacitive sensing points T11~T15, the third row of self-capacitive sensing points T31~T35 and the fifth row of sensing electrodes T51~T55 are aligned; the second row of self-capacitive sensing points T21~T24 and the fourth row of self-capacitive sensing points T41~T44 are aligned.

Wherein, the position of each self-capacitive sensing point of the second row of self-capacitive sensing points T21~T24 corresponds to the position between any two self-capacitive sensing points of the first row of self-capacitive sensing points T11~T15 and the position between any two self-capacitive sensing points of the third row of self-capacitive sensing points T31~T35 respectively. Similarly, the position of each self-capacitive sensing point of the fourth row of self-capacitive sensing points T41~T44 corresponds to the position between any two self-capacitive sensing points of the third row of self-capacitive sensing points T31~T35 and the position between any two self-capacitive sensing points of the fifth row of self-capacitive sensing points T51~T55 respectively. For example, the horizontal distance between the self-capacitive sensing point T21 of the second row of self-capacitive sensing points T21~T24 and the self-capacitive sensing point T11 of the first row of self-capacitive sensing points T11~T15 is half of the first distance d1, namely (d1)/2.

Figure 3C:
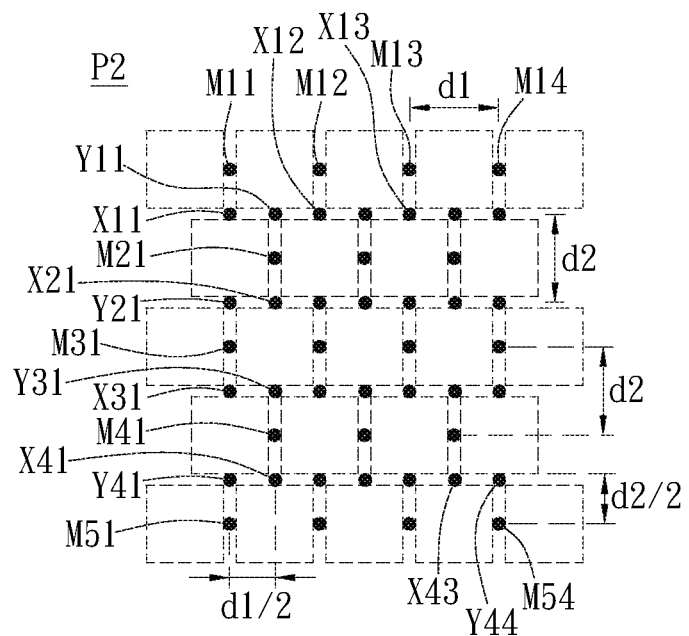

When the capacitive fingerprint sensing apparatus 1 is operated in the mutual-capacitive sensing mode, the sensing driver 12 will perform mutual-capacitive sensing on any two adjacent sensing electrodes of the sensing electrodes E11~E55 respectively to obtain the second fingerprint sensing signal N2 corresponding to mutual-capacitive sensing, and then the processing module 14 will generate the second fingerprint pattern P2 corresponding to mutual-capacitive sensing according to the second fingerprint sensing signal N2, as shown in FIG. 3C.

From the second fingerprint pattern P2 shown in FIG. 3C, it can be found that the second fingerprint pattern P2 corresponding to mutual-capacitive sensing can include a plurality of first mutual-capacitive sensing points (e.g., M11~M54), a plurality of second mutual-capacitive sensing points (e.g., X11~X43) and a plurality of third mutual-capacitive sensing points (e.g., Y11~Y44).

The plurality of first mutual-capacitive sensing points (e.g., M11~M54) is obtained by the sensing driver 12 performing mutual-capacitive sensing on any two adjacent sensing electrodes of the same row of sensing electrodes respectively; therefore, the position of the first mutual-capacitive sensing point will correspond to the position between the two adjacent sensing electrodes. In the horizontal direction, the distance between two adjacent first mutual-capacitive sensing points equals to the first distance d1; in the vertical direction, the distance between two adjacent first mutual-capacitive sensing points equals to the second distance d2.

For example, the first mutual-capacitive sensing point M11 is obtained by the sensing driver 12 performing mutual-capacitive sensing on two adjacent sensing electrodes E11 and E12 of the first row of sensing electrodes E11~E15 respectively; therefore, the position of the first mutual-capacitive sensing point M11 will correspond to the position between the two adjacent sensing electrodes E11 and E12. Similarly, the first mutual-capacitive sensing point M54 is obtained by the sensing driver 12 performing mutual-capacitive sensing on two adjacent sensing electrodes E54 and E55 of the fifth row of sensing electrodes E51~E55 respectively; therefore, the position of the first mutual-capacitive sensing point M54 will correspond to the position between the two adjacent sensing electrodes E54 and E55, and so on.

When the capacitive fingerprint sensing apparatus 1 is operated in the mutual-capacitive sensing mode, the sensing driver 12 can select one of the sensing electrodes as a signal transmitter (TX) and select another M3 sensing electrodes adjacent to the sensing electrode combined as a signal receiver (RX) to form a mutual-capacitive sensing electrode set to sense a mutual capacitance between the signal transmitter and the signal receiver. The sensing points of the second fingerprint pattern P2 obtained by the sensing driver 12 performing mutual-capacitive sensing will correspond to a sensing gravity center of the self-capacitive sensing electrode set, wherein M3 is a positive integer larger than 1. In addition, the sensing driver 12 can also select one of the sensing electrodes as a signal receiver (RX) and select another M4 sensing electrodes adjacent to the sensing electrode combined as signal transmitter (TX) to form a mutual-capacitive sensing electrode set to sense a mutual capacitance between the signal transmitter and the signal receiver. The sensing points of the second fingerprint pattern P2 obtained by the sensing driver 12 performing mutual-capacitive sensing will correspond to a sensing gravity center of the self-capacitive sensing electrode set, wherein M4 is a positive integer larger than 1.

In practical applications, the sensing driver 12 can select two adjacent sensing electrodes of the first row of sensing electrodes and select one sensing electrode of the second row of sensing electrodes corresponding to the two adjacent sensing electrodes to form a self-capacitive sensing electrode set to perform mutual-capacitive sensing to obtain the plurality of second mutual-capacitive sensing points (e.g., X11~X43). Therefore, the positions of the second mutual-capacitive sensing points will correspond to the sensing gravity center of the self-capacitive sensing electrode set formed by these three sensing electrodes. In the horizontal direction, the distance between two adjacent second mutual-capacitive sensing points equals to the first distance d1; in the vertical direction, the distance between two adjacent second mutual-capacitive sensing points equals to the second distance d2.

For example, the second mutual-capacitive sensing point X11 is obtained by the sensing driver 12 performing mutual-capacitive sensing on two adjacent sensing electrodes E11 and E12 of the first row of sensing electrodes E11~E15 and the adjacent sensing electrode E21 of the second row of sensing electrodes E21~E25 respectively; therefore, the position of the second mutual-capacitive sensing point X11 will correspond to the position among the three adjacent sensing electrodes E11~E12 and E21. Similarly, the second mutual-capacitive sensing point X43 is obtained by the sensing driver 12 performing mutual-capacitive sensing on two adjacent sensing electrodes E43 and E44 of the fourth row of sensing electrodes E41~E44 and the adjacent sensing electrode E54 of the fifth row of sensing electrodes E51~E55 respectively; therefore, the position of the second mutual-capacitive sensing point X43 will correspond to the position among the three adjacent sensing electrodes E43~E44 and E54, and so on.

The sensing driver 12 can select one sensing electrode of the first row of sensing electrodes and select two adjacent sensing electrodes of the second row of sensing electrodes corresponding to the sensing electrode to form a self-capacitive sensing electrode set to perform mutual-capacitive sensing to obtain the plurality of third mutual-capacitive sensing points (e.g., Y11~Y44). Therefore, the positions of the third mutual-capacitive sensing points will correspond to the position among these three sensing electrodes. In the horizontal direction, the distance between two adjacent third mutual-capacitive sensing points equals to the first distance d1; in the vertical direction, the distance between two adjacent third mutual-capacitive sensing points equals to the second distance d2.

For example, the third mutual-capacitive sensing point Y11 is obtained by the sensing driver 12 performing mutual-capacitive sensing on one sensing electrode E12 of the first row of sensing electrodes E11~E15 and the adjacent two sensing electrodes E21 and E22 of the second row of sensing electrodes E21~E25 respectively; therefore, the position of the third mutual-capacitive sensing point Y11 will correspond to the position among the three adjacent sensing electrodes E12 and E21~E22. Similarly, the third mutual-capacitive sensing point Y44 is obtained by the sensing driver 12 performing mutual-capacitive sensing on one sensing electrode E44 of the fourth row of sensing electrodes E41~E44 and the adjacent sensing electrodes E54~E55 of the fifth row of sensing electrodes E51~E55 respectively; therefore, the position of the third mutual-capacitive sensing point Y44 will correspond to the position among the three adjacent sensing electrodes E44 and E54~E55, and so on.

Figure 3D:
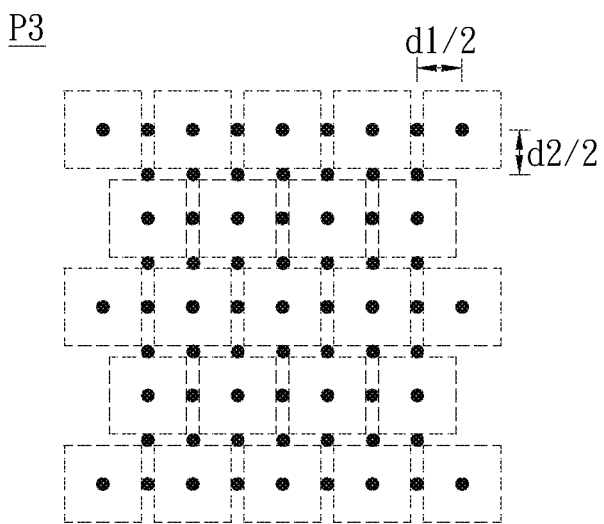

Then, the processing module 14 will combine the first fingerprint pattern P1 and the second fingerprint pattern P2 into a combined fingerprint pattern P3, as shown in FIG. 3D. From the combined fingerprint pattern P3 shown in FIG. 3D, it can be found that the combined fingerprint pattern P3 can include the self-capacitive sensing points T11~T55 of the first fingerprint pattern P1 and the first mutual-capacitive sensing points M11~M54, the second mutual-capacitive sensing points X11~X43 and the third mutual-capacitive sensing points Y11~Y44.

Therefore, in the horizontal direction, the distance between any two adjacent sensing points (e.g., the self-capacitive sensing point T11 and the first mutual-capacitive sensing point M11) of the combined fingerprint pattern P3 is half of the first distance d1, namely (d1)/2; in the vertical direction, the distance between any two adjacent sensing points (e.g., the self-capacitive sensing point T12 and the third mutual-capacitive sensing point Y11) of the combined fingerprint pattern P3 is half of the second distance d2, namely (d2)/2.

Above all, it can be found that the resolution of the combined fingerprint pattern P3 along at least one direction (e.g., the horizontal direction, the vertical direction and/or any other directions) will be larger than the resolution of the first fingerprint pattern P1 and the resolution of the second fingerprint pattern P2 along the at least one direction. Therefore, the combined fingerprint pattern P3 obtained by the capacitive fingerprint sensing apparatus 1 of the invention can still maintain high resolution without reducing its resolution.

Then, please refer to FIG. 4A~FIG. 4D. FIG. 4A~FIG. 4D illustrate the plurality of sensing electrodes, the first fingerprint pattern obtained in the self-capacitive sensing mode, the second fingerprint pattern obtained in the mutual-capacitive sensing mode and the combined fingerprint pattern obtained by combining the first fingerprint pattern and the second fingerprint pattern respectively in the third embodiment of the invention.

Figure 4A:
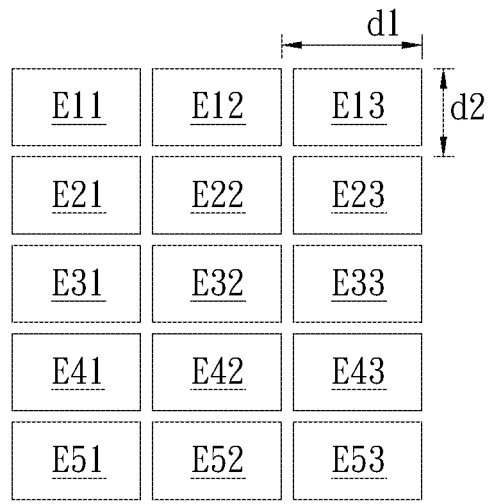

As shown in FIG. 4A, in the third embodiment of the invention, the sensing electrodes E11~E53 are aligned and arranged in a form of matrix the same as FIG. 2, but the shape of the sensing electrodes E11~E53 is rectangle different from the square shape of the sensing electrodes shown in FIG. 2. In the horizontal direction, the sensing electrodes E11~E53 includes a first row of sensing electrodes E11~E13, a second row of sensing electrodes E21~E23, a third row of sensing electrodes E31~E33, a fourth row of sensing electrodes E41~E43 and a fifth row of sensing electrodes E51~E53; for each row of sensing electrodes, there is a first distance d1 between two adjacent sensing electrodes. In the vertical direction, the sensing electrodes E11~E53 includes a first column of sensing electrodes E11~E51, a second column of sensing electrodes E12~E52 and a third row of sensing electrodes E13~E53; for each column of sensing electrodes, there is a second distance d2 between two adjacent sensing electrodes. In this embodiment, since the shape of the sensing electrodes E11~E53 is rectangle, the first distance d1 will be larger than the second distance d2, but not limited to this.

It should be noticed that, when the capacitive fingerprint sensing apparatus 1 is operated in the self-capacitive sensing mode, the sensing driver 12 can select N sensing electrodes of the sensing electrodes to be combined into a self-capacitive sensing electrode set to perform self-capacitive sensing, wherein N is a positive integer larger than 1.

Figure 4B:
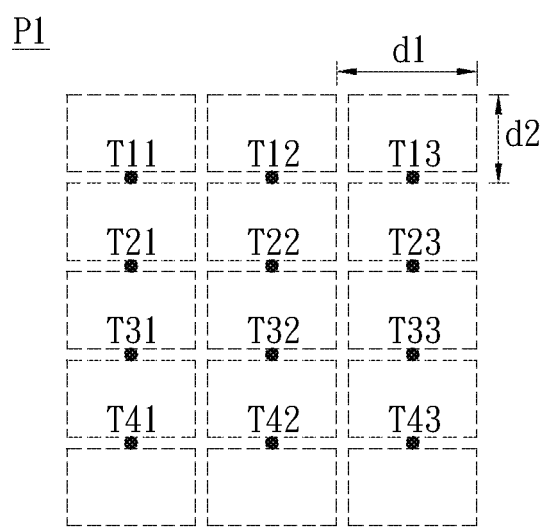

For example, when the capacitive fingerprint sensing apparatus 1 is operated in the self-capacitive sensing mode, the sensing driver 12 can select any two adjacent sensing electrodes of each row of sensing electrodes along the vertical direction to be combined into the self-capacitive sensing electrode set to perform self-capacitive sensing to obtain a first fingerprint sensing signal N1 corresponding to self-capacitive sensing and then the processing module 14 will generate a first fingerprint pattern P1 corresponding to self-capacitive sensing according to the first fingerprint sensing signal N1, as shown in FIG. 4B.

From the first fingerprint pattern P1 shown in FIG. 4B, it can be found that the first fingerprint pattern P1 corresponding to self-capacitive sensing includes a plurality of self-capacitive sensing points T11~T43, and the self-capacitive sensing point T11 corresponds to two vertically adjacent sensing electrodes E11 and E21, the self-capacitive sensing point T12 corresponds to two vertically adjacent sensing electrodes E12 and E22, . . . , the self-capacitive sensing point T42 corresponds to two vertically adjacent sensing electrodes E42 and E52 and the self-capacitive sensing point T43 corresponds to two vertically adjacent sensing electrodes E43 and E53. In this embodiment, the positions of the self-capacitive sensing points T11~T43 will correspond to the sensing gravity center positions of the plurality of vertically adjacent self-capacitive sensing sets E11 and E21, E12 and E22, . . . , and E43 and E53, but not limited to this.

It should be noticed that, in the horizontal direction, the distance between any two adjacent self-capacitive sensing points of the first fingerprint pattern P1 equals to the first distance d1; in the vertical direction, the distance between any two adjacent self-capacitive sensing points of the first fingerprint pattern P1 equals to the second distance d2.

In practical applications, when the capacitive fingerprint sensing apparatus 1 is operated in the mutual-capacitive sensing mode, the sensing driver 12 can select at least two adjacent sensing electrodes to form a mutual-capacitive sensing electrode set and select a part of the mutual-capacitive sensing electrode set as a signal transmitter (TX) and another part of the mutual-capacitive sensing electrode set as a signal receiver (RX) to sense a mutual-capacitance between the signal transmitter and the signal receiver. In addition, the sensing driver 12 can also combine M1 sensing electrodes of the sensing electrodes as the signal transmitter (TX) and combine another M2 sensing electrodes adjacent to the M1 sensing electrodes as the signal receiver (RX) to form the mutual-capacitive sensing electrode set to sense the mutual-capacitance between the signal transmitter and the signal receiver to obtain a second fingerprint pattern, wherein M1 and M2 are both positive integers larger than 1. At this time, the sensing points obtained by the mutual-capacitive sensing of the sensing driver 12 will correspond to the sensing gravity center positions of the mutual-capacitive sensing electrode sets respectively.

For example, when the capacitive fingerprint sensing apparatus 1 is operated in the mutual-capacitive sensing mode, the sensing driver 12 will select any two adjacent sensing electrodes of one row of sensing electrodes (e.g., E11 and E12 of the first row of sensing electrodes E11~E13) to be combined into a signal transmitter (TX) and select two corresponding adjacent sensing electrodes of the adjacent row (e.g., E21 and E22 of the second row of sensing electrodes E21~E23) to be combined into a signal receiver (RX) to perform mutual-capacitive sensing to obtain a second fingerprint sensing signal N2 corresponding mutual-capacitive sensing, or the sensing driver 12 will select any two adjacent sensing electrodes of one column of sensing electrodes (e.g., E11 and E21 of the first column of sensing electrodes E11~E51) to be combined into a signal transmitter (TX) and select two corresponding adjacent sensing electrodes of the adjacent column (e.g., E12 and E22 of the second column of sensing electrodes E12~E52) to be combined into a signal receiver (RX) to perform mutual-capacitive sensing to obtain a second fingerprint sensing signal N2 corresponding mutual-capacitive sensing. And then, the processing module 14 will generate a second fingerprint pattern P2 corresponding to mutual-capacitive sensing according to the second fingerprint sensing signal N2, as shown in FIG. 4C.

Figure 4C:
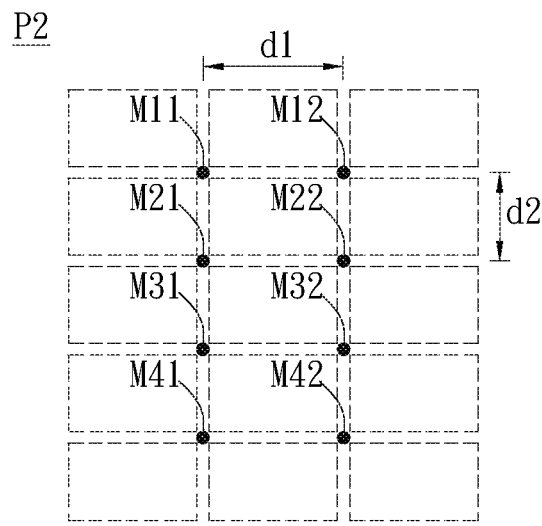

From the second fingerprint pattern P2 shown in FIG. 4C, it can be found that the second fingerprint pattern P2 corresponding to mutual-capacitive sensing can include a plurality of mutual-capacitive sensing points such as M11~M42. Since the mutual-capacitive sensing point is obtained by the sensing driver 12 performing mutual-capacitive sensing on four vertically and horizontally adjacent sensing electrodes respectively, the position of the mutual-capacitive sensing point corresponds to the position among these four adjacent sensing electrodes. For example, the mutual-capacitive sensing point M11 is located among the four adjacent sensing electrodes E11, E12, E21 and E22. In the horizontal direction, the distance between two adjacent mutual-capacitive sensing points equals to the first distance d1; in the vertical direction, the distance between two adjacent mutual-capacitive sensing points equals to the second distance d2.

For example, the sensing driver 12 can perform mutual-capacitive sensing on the combined two adjacent sensing electrodes E11 and E21 of the first column of sensing electrodes E11~E51 and the combined two adjacent sensing electrodes E12 and E22 of the second column of sensing electrodes E12~E52 to obtain the mutual-capacitive sensing point M11, or the sensing driver 12 can perform mutual-capacitive sensing on the combined two adjacent sensing electrodes E11 and E12 of the first row of sensing electrodes E11~E13 and the combined two adjacent sensing electrodes E21 and E22 of the second row of sensing electrodes E21~E23 to obtain the mutual-capacitive sensing point M11.

Therefore, the position of the mutual-capacitive sensing point M11 will correspond to the position among these four adjacent sensing electrodes E11~E12 and E21~E22. Similarly, the position of the mutual-capacitive sensing point M42 will correspond to the position among four adjacent sensing electrodes E42~E43 and E52~E53, and so on.

Figure 4D:
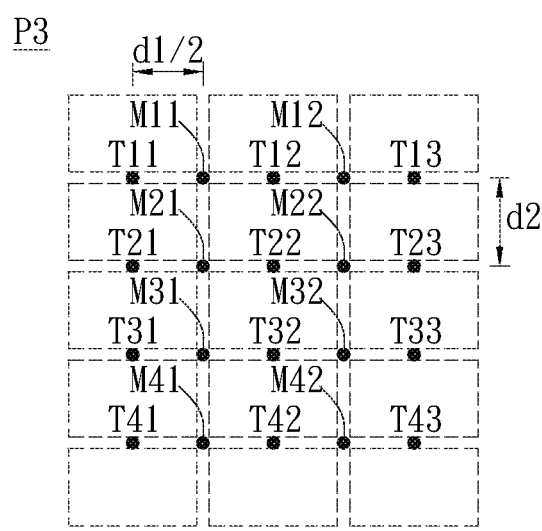

Then, the processing module 14 will combine the first fingerprint pattern P1 and the second fingerprint pattern P2 into a combined fingerprint pattern P3, as shown in FIG. 4D. From the combined fingerprint pattern P3 shown in FIG. 4D, it can be found that the combined fingerprint pattern P3 can include the self-capacitive sensing points T11~T43 of the first fingerprint pattern P1 and the mutual-capacitive sensing points M11~M43 of the second fingerprint pattern P2.

Therefore, in the horizontal direction, the distance between any two adjacent sensing points (e.g., the self-capacitive sensing points T11 and the mutual-capacitive sensing point M11) of the combined fingerprint pattern P3 is half of the first distance d1, namely (d1)/2; in the vertical direction, the distance between any two adjacent sensing points (e.g., the self-capacitive sensing points T11 and T21 or the mutual-capacitive sensing points M11 and M21) of the combined fingerprint pattern P3 equals to the second distance d2.

Above all, it can be found that the resolution of the combined fingerprint pattern P3 along the horizontal direction will be larger than the resolution of the first fingerprint pattern P1 and the resolution of the second fingerprint pattern P2 along the horizontal direction; the resolution of the combined fingerprint pattern P3 along the vertical direction will equal to the resolution of the first fingerprint pattern P1 and the resolution of the second fingerprint pattern P2 along the vertical direction Therefore, the combined fingerprint pattern P3 obtained by the capacitive fingerprint sensing apparatus 1 of the invention can still maintain high resolution without reducing its resolution.

Figure 5A:
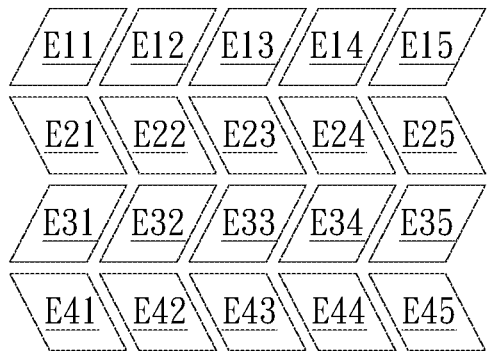
Figure 5B:
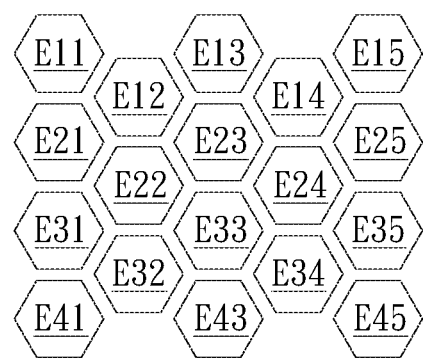

Then, please refer to FIG. 5A~FIG. 5B. FIG. 5A~FIG. 5B illustrate arrangements of sensing electrodes having different shapes and sizes respectively. As shown in FIG. 5A~FIG. 5B, the sensing electrodes E11~E44 of FIG. 5A and the sensing electrodes E11~E45 of FIG. 5B are arranged in different regular ways and have different shapes and sizes respectively. In practical applications, the plurality of sensing electrodes can have arbitrary geometries and the plurality of sensing electrodes can have the same size and shape, or the plurality of sensing electrodes can have different sizes and shapes without any specific limitations. In addition, the angle between any two adjacent sensing electrodes can be arbitrary without any specific limitations.

Figure 6A:
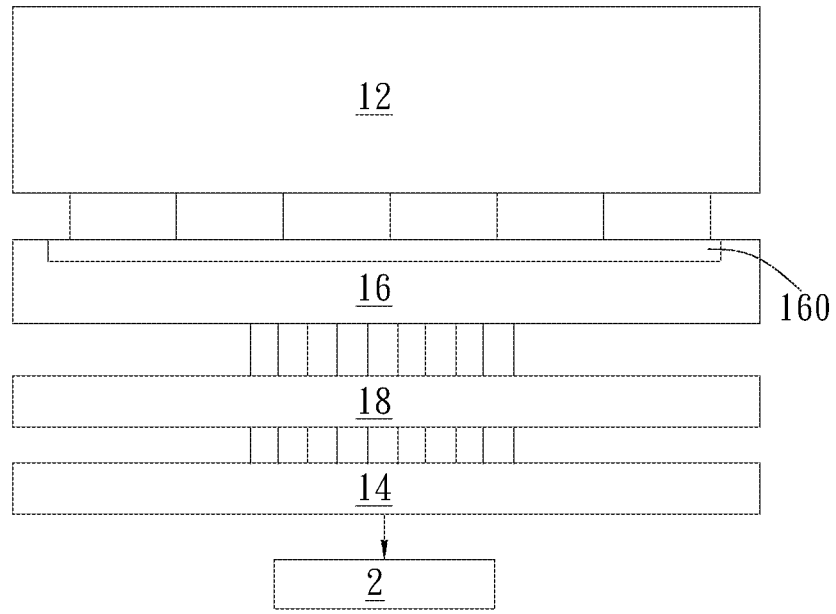
FIG. 6A illustrates a schematic diagram of the sensing driver coupled to the processing module though the switching module and the amplifying module.
Figure 6B:
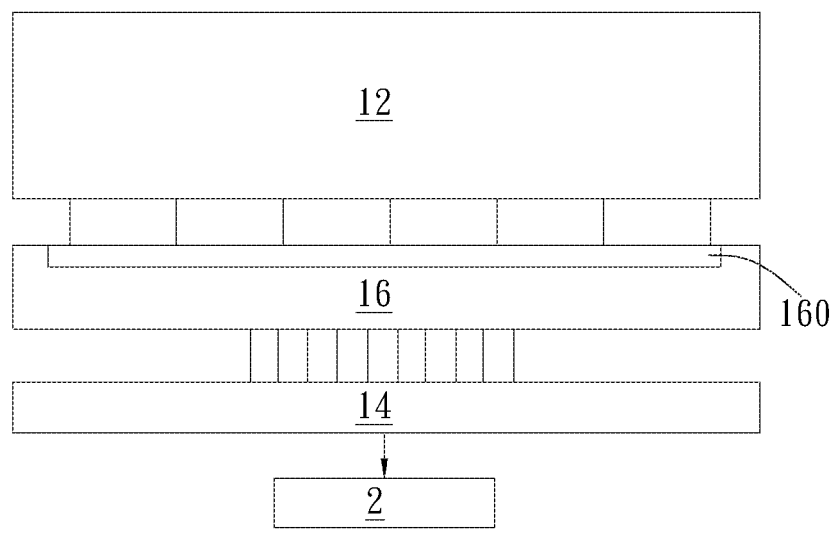
FIG. 6B illustrates a schematic diagram of the sensing driver coupled to the processing module though the switching module.

Please refer to FIG. 6A~FIG. 6B. FIG. 6A illustrates a schematic diagram of the sensing driver coupled to the processing module though the switching module and the amplifying module. FIG. 6B illustrates a schematic diagram of the sensing driver coupled to the processing module though the switching module.

As shown in FIG. 6A, the capacitive fingerprint sensing apparatus 1 can further include a switching module 16 and an amplifying module 18. The switching module 16 and the amplifying module 18 are coupled between the sensing driver 12 and the processing module 14. The switching module 16 selectively switches to the self-capacitive sensing mode or the mutual-capacitive sensing mode through a mode switching unit 160 and transmits the first fingerprint sensing signal N1 and the second fingerprint sensing signal N2 to the amplifying module 18 and then amplified by the amplifying module 18 and transmitted to the processing module 14. The processing module 14 can also coupled to a host 2. After the processing module 14 obtains the first fingerprint sensing pattern P1 and the second fingerprint sensing pattern P2 according to the first fingerprint sensing signal N1 and the second fingerprint sensing signal N2 and then combines them into the combined fingerprint pattern P3, the processing module 14 can transmit the combined fingerprint pattern P3 to the host 2.

As shown in FIG. 6B, the capacitive fingerprint sensing apparatus 1 can include no amplifying module and the switching module 16 selectively switches to the self-capacitive sensing mode or the mutual-capacitive sensing mode through a mode switching unit 160 and directly transmits the first fingerprint sensing signal N1 and the second fingerprint sensing signal N2 to the processing module 14. The processing module 14 can also coupled to a host 2. After the processing module 14 obtains the first fingerprint sensing pattern P1 and the second fingerprint sensing pattern P2 according to the first fingerprint sensing signal N1 and the second fingerprint sensing signal N2 and then combines them into the combined fingerprint pattern P3, the processing module 14 can transmit the combined fingerprint pattern P3 to the host 2.

Figure 7:
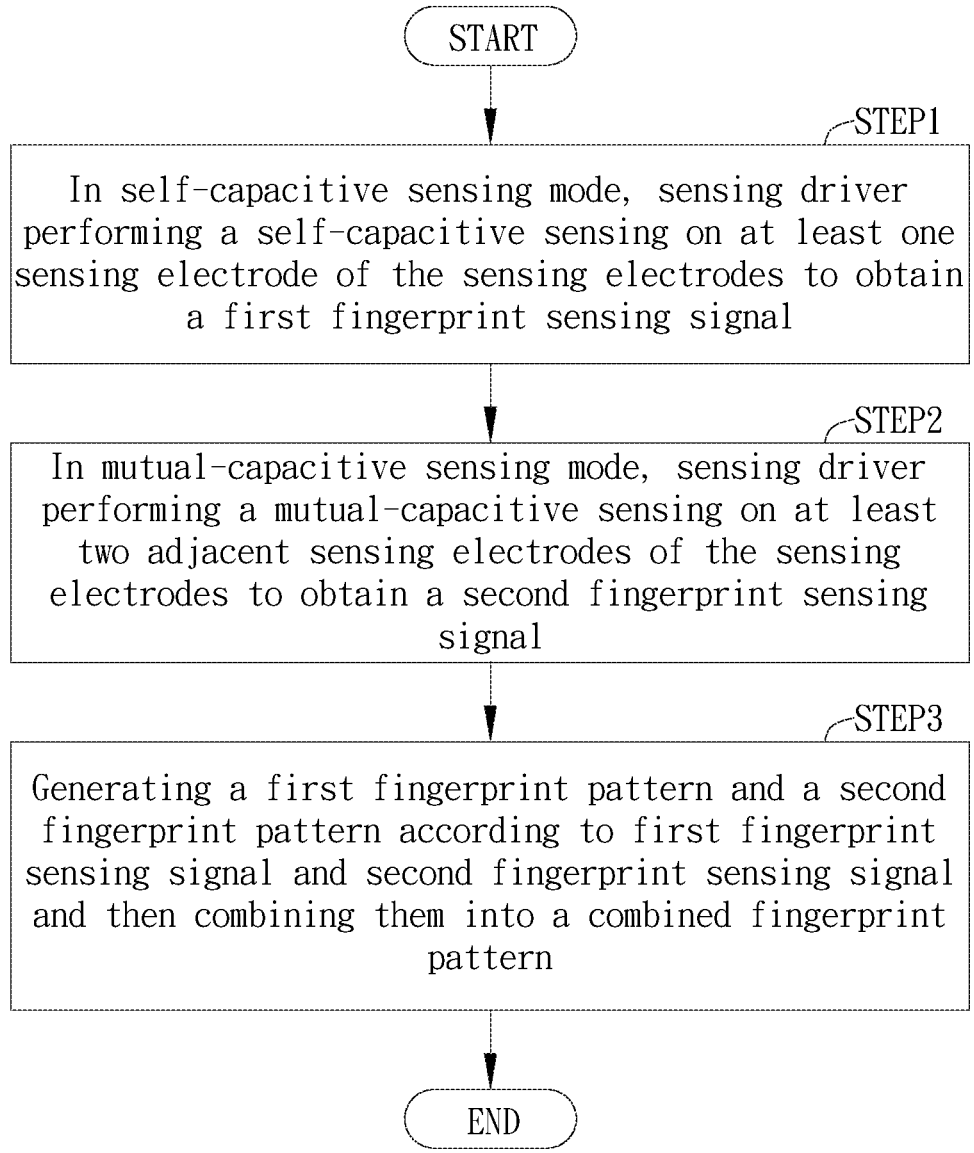
FIG. 7 illustrates a flowchart of the capacitive fingerprint sensing method in another embodiment of the invention.

As shown in FIG. 7, the capacitive fingerprint sensing method includes steps of: (STEP 1) when the capacitive fingerprint sensing apparatus is operated in the self-capacitive sensing mode, the sensing driver performing a self-capacitive sensing on at least one sensing electrode of the plurality of sensing electrodes to obtain a first fingerprint sensing signal; (STEP2) when the capacitive fingerprint sensing apparatus is operated in the mutual-capacitive sensing mode, the sensing driver performing a mutual-capacitive sensing on at least two adjacent sensing electrodes of the plurality of sensing electrodes to obtain a second fingerprint sensing signal; and (STEP3) generating a first fingerprint pattern and a second fingerprint pattern according to the first fingerprint sensing signal and the second fingerprint sensing signal respectively and then combining the first fingerprint pattern and the second fingerprint pattern into a combined fingerprint pattern; wherein a resolution of the combined fingerprint pattern along at least one direction is larger than a resolution of the first fingerprint pattern along the at least one direction and a resolution of the second fingerprint pattern along the at least one direction. As to the detail of the capacitive fingerprint sensing method, please refer to the context and figures in the above-mentioned embodiments.

Compared to the prior art, the capacitive fingerprint sensing apparatus and capacitive fingerprint sensing method of the invention perform fingerprint sensing through self-capacitive sensing technology and mutual-capacitive sensing technology respectively and combine the self-capacitive fingerprint pattern and the mutual-capacitive fingerprint pattern into a combined fingerprint pattern. Therefore, the capacitive fingerprint sensing apparatus and capacitive fingerprint sensing method of the invention can effectively increase the capacity sensed by the unit sensing electrode without decreasing its high resolution. As a result, not only the noise interference can be reduced to increase the accuracy of fingerprint recognition, but also the number of signal traces can be also reduced to simplify the circuit structure and save the chip area.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A capacitive fingerprint sensing apparatus operated in a self-capacitive sensing mode or a mutual-capacitive sensing mode, the capacitive fingerprint sensing apparatus comprising:
a plurality of sensing electrodes;
a sensing driver coupled to the plurality of sensing electrodes, when the capacitive fingerprint sensing apparatus is operated in the self-capacitive sensing mode, the sensing driver performing a self-capacitive sensing on at least one sensing electrode of the plurality of sensing electrodes to obtain a first fingerprint sensing signal; when the capacitive fingerprint sensing apparatus is operated in the mutual-capacitive sensing mode, the sensing driver performing a mutual-capacitive sensing on at least two adjacent sensing electrodes of the plurality of sensing electrodes to obtain a second fingerprint sensing signal; and
a processing module coupled to the sensing driver and configured to generate a first fingerprint pattern and a second fingerprint pattern according to the first fingerprint sensing signal and the second fingerprint sensing signal respectively and then combine the first fingerprint pattern and the second fingerprint pattern into a combined fingerprint pattern;
wherein a resolution of the combined fingerprint pattern along at least one direction is larger than a resolution of the first fingerprint pattern along the at least one direction and a resolution of the second fingerprint pattern along the at least one direction.

2. The capacitive fingerprint sensing apparatus of claim 1, wherein the sensing driver selects the at least two adjacent sensing electrodes of the plurality of sensing electrodes to form a mutual-capacitive sensing electrode set and then selects a part of the mutual-capacitive sensing electrode set as a signal transmitter and another part of the mutual-capacitive sensing electrode set as a signal receiver to sense a mutual capacitance between the signal transmitter and the signal receiver.

3. The capacitive fingerprint sensing apparatus of claim 1, wherein an angle between the at least two adjacent sensing electrodes is arbitrary.

4. The capacitive fingerprint sensing apparatus of claim 1, wherein the plurality of sensing electrodes has arbitrary geometries.

5. The capacitive fingerprint sensing apparatus of claim 1, wherein the plurality of sensing electrodes has the same size and shape or different sizes or shapes.

6. The capacitive fingerprint sensing apparatus of claim 5, wherein the plurality of sensing electrodes is arranged in a regular way.

7. The capacitive fingerprint sensing apparatus of claim 5, wherein when the capacitive fingerprint sensing apparatus is operated in the self-capacitive sensing mode, the sensing driver combines N sensing electrodes of the plurality of sensing electrodes as a self-capacitive sensing electrode set to perform the self-capacitive sensing, N is a positive integer larger than 1.

8. The capacitive fingerprint sensing apparatus of claim 7, wherein sensing points on the first fingerprint pattern obtained by the sensing driver performing the self-capacitive sensing correspond to a sensing gravity center of the self-capacitive sensing electrode set.

9. The capacitive fingerprint sensing apparatus of claim 1, wherein when the capacitive fingerprint sensing apparatus is operated in the mutual-capacitive sensing mode, the sensing driver combines M1 sensing electrodes of the plurality of sensing electrodes as a signal transmitter and also combines another M2 sensing electrodes adjacent to the M1 sensing electrodes as a signal receiver to form a mutual-capacitive sensing electrode set to sense a mutual-capacitance between the signal transmitter and the signal receiver, M1 and M2 are both integers larger than 1.

10. The capacitive fingerprint sensing apparatus of claim 9, wherein sensing points on the second fingerprint pattern obtained by the sensing driver performing the mutual-capacitive sensing correspond to a sensing gravity center of the mutual-capacitive sensing electrode set.

11. The capacitive fingerprint sensing apparatus of claim 1, wherein when the capacitive fingerprint sensing apparatus is operated in the mutual-capacitive sensing mode, the sensing driver selects a sensing electrode of the plurality of sensing electrodes as a signal transmitter and combines another M3 sensing electrodes adjacent to the sensing electrode as a signal receiver to form a mutual-capacitive sensing electrode set to sense a mutual-capacitance between the signal transmitter and the signal receiver, sensing points on the second fingerprint pattern obtained by the sensing driver performing the mutual-capacitive sensing correspond to a sensing gravity center of the mutual-capacitive sensing electrode set, M3 is an integer larger than 1.

12. The capacitive fingerprint sensing apparatus of claim 1, wherein when the capacitive fingerprint sensing apparatus is operated in the mutual-capacitive sensing mode, the sensing driver selects a sensing electrode of the plurality of sensing electrodes as a signal receiver and combines another M4 sensing electrodes adjacent to the sensing electrode as a signal transmitter to form a mutual-capacitive sensing electrode set to sense a mutual-capacitance between the signal transmitter and the signal receiver, sensing points on the second fingerprint pattern obtained by the sensing driver performing the mutual-capacitive sensing correspond to a sensing gravity center of the mutual-capacitive sensing electrode set, M4 is an integer larger than 1.

13. The capacitive fingerprint sensing apparatus of claim 1, wherein sensing points of the first fingerprint pattern and sensing points of the second fingerprint pattern are interlaced to make the resolution of the combined fingerprint pattern larger than the resolution of the first fingerprint pattern or the resolution of the second fingerprint pattern.

14. The capacitive fingerprint sensing apparatus of claim 1, wherein the first fingerprint pattern and the second fingerprint pattern have different resolutions along different directions.

15. The capacitive fingerprint sensing apparatus of claim 1, wherein the combined fingerprint pattern has different resolutions along different directions.

16. The capacitive fingerprint sensing apparatus of claim 1, wherein when the capacitive fingerprint sensing apparatus is operated in the self-capacitive sensing mode, sensing electrodes around the at least one sensing electrode performing the self-capacitive sensing can receive a fixed DC voltage, a ground voltage, a variable AC voltage or a sensing related signal to reduce interference on fingerprint sensing.

17. The capacitive fingerprint sensing apparatus of claim 1, wherein when the capacitive fingerprint sensing apparatus is operated in the mutual-capacitive sensing mode, sensing electrodes around the at least two sensing electrodes performing the mutual-capacitive sensing can receive a fixed DC voltage, a ground voltage, a variable AC voltage or a sensing related signal to reduce interference on fingerprint sensing.

18. The capacitive fingerprint sensing apparatus of claim 1, further comprising:
a switching module coupled between the sensing driver and the processing module and configured to selectively switch to the self-capacitive sensing mode or the mutual-capacitive sensing mode and transmit the first fingerprint sensing signal and the second fingerprint sensing signal to the processing module.

19. The capacitive fingerprint sensing apparatus of claim 1, further comprising:
an amplifying module coupled between the switching module and the processing module and configured to amplify the first fingerprint sensing signal and the second fingerprint sensing signal and then transmit the amplified first fingerprint sensing signal and second fingerprint sensing signal to the processing module.

20. A capacitive fingerprint sensing method applied to a capacitive fingerprint sensing apparatus operated in a self-capacitive sensing mode or a mutual-capacitive sensing mode, the capacitive fingerprint sensing apparatus comprising a plurality of sensing electrodes and a sensing driver, the capacitive fingerprint sensing method comprising steps of:
(a) when the capacitive fingerprint sensing apparatus is operated in the self-capacitive sensing mode, the sensing driver performing a self-capacitive sensing on at least one sensing electrode of the plurality of sensing electrodes to obtain a first fingerprint sensing signal;
(b) when the capacitive fingerprint sensing apparatus is operated in the mutual-capacitive sensing mode, the sensing driver performing a mutual-capacitive sensing on at least two adjacent sensing electrodes of the plurality of sensing electrodes to obtain a second fingerprint sensing signal; and
(c) generating a first fingerprint pattern and a second fingerprint pattern according to the first fingerprint sensing signal and the second fingerprint sensing signal respectively and then combining the first fingerprint pattern and the second fingerprint pattern into a combined fingerprint pattern;
wherein a resolution of the combined fingerprint pattern along at least one direction is larger than a resolution of the first fingerprint pattern along the at least one direction and a resolution of the second fingerprint pattern along the at least one direction.

21. The capacitive fingerprint sensing method of claim 20, wherein the sensing driver selects the at least two adjacent sensing electrodes of the plurality of sensing electrodes to form a mutual-capacitive sensing electrode set and then selects a part of the mutual-capacitive sensing electrode set as a signal transmitter and another part of the mutual-capacitive sensing electrode set as a signal receiver to sense a mutual capacitance between the signal transmitter and the signal receiver.

22. The capacitive fingerprint sensing method of claim 20, wherein an angle between the at least two adjacent sensing electrodes is arbitrary.

23. The capacitive fingerprint sensing method of claim 20, wherein the plurality of sensing electrodes has arbitrary geometries.

24. The capacitive fingerprint sensing method of claim 20, wherein the plurality of sensing electrodes has the same size and shape or different sizes or shapes.

25. The capacitive fingerprint sensing method of claim 20, wherein the plurality of sensing electrodes is arranged in a regular way.

26. The capacitive fingerprint sensing method of claim 20, wherein when the capacitive fingerprint sensing apparatus is operated in the self-capacitive sensing mode, the sensing driver combines N sensing electrodes of the plurality of sensing electrodes as a self-capacitive sensing electrode set to perform the self-capacitive sensing, N is a positive integer larger than 1.

27. The capacitive fingerprint sensing method of claim 26, wherein sensing points on the first fingerprint pattern obtained by the sensing driver performing the self-capacitive sensing correspond to a sensing gravity center of the self-capacitive sensing electrode set.

28. The capacitive fingerprint sensing method of claim 20, wherein when the capacitive fingerprint sensing apparatus is operated in the mutual-capacitive sensing mode, the sensing driver combines M1 sensing electrodes of the plurality of sensing electrodes as a signal transmitter and also combines another M2 sensing electrodes adjacent to the M1 sensing electrodes as a signal receiver to form a mutual-capacitive sensing electrode set to sense a mutual-capacitance between the signal transmitter and the signal receiver, M1 and M2 are both integers larger than 1.

29. The capacitive fingerprint sensing method of claim 28, wherein sensing points on the second fingerprint pattern obtained by the sensing driver performing the mutual-capacitive sensing correspond to a sensing gravity center of the mutual-capacitive sensing electrode set.

30. The capacitive fingerprint sensing method of claim 20, wherein when the capacitive fingerprint sensing apparatus is operated in the mutual-capacitive sensing mode, the sensing driver selects a sensing electrode of the plurality of sensing electrodes as a signal transmitter and combines another M3 sensing electrodes adjacent to the sensing electrode as a signal receiver to form a mutual-capacitive sensing electrode set to sense a mutual-capacitance between the signal transmitter and the signal receiver, sensing points on the second fingerprint pattern obtained by the sensing driver performing the mutual-capacitive sensing correspond to a sensing gravity center of the mutual-capacitive sensing electrode set, M3 is an integer larger than 1.

31. The capacitive fingerprint sensing method of claim 20, wherein when the capacitive fingerprint sensing apparatus is operated in the mutual-capacitive sensing mode, the sensing driver selects a sensing electrode of the plurality of sensing electrodes as a signal receiver and combines another M4 sensing electrodes adjacent to the sensing electrode as a signal transmitter to form a mutual-capacitive sensing electrode set to sense a mutual-capacitance between the signal transmitter and the signal receiver, sensing points on the second fingerprint pattern obtained by the sensing driver performing the mutual-capacitive sensing correspond to a sensing gravity center of the mutual-capacitive sensing electrode set, M4 is an integer larger than 1.

32. The capacitive fingerprint sensing method of claim 20, wherein sensing points of the first fingerprint pattern and sensing points of the second fingerprint pattern are interlaced to make the resolution of the combined fingerprint pattern larger than the resolution of the first fingerprint pattern or the resolution of the second fingerprint pattern.

33. The capacitive fingerprint sensing method of claim 20, wherein the first fingerprint pattern and the second fingerprint pattern have different resolutions along different directions.

34. The capacitive fingerprint sensing method of claim 20, wherein the combined fingerprint pattern has different resolutions along different directions.

35. The capacitive fingerprint sensing method of claim 20, wherein when the capacitive fingerprint sensing apparatus is operated in the self-capacitive sensing mode, sensing electrodes around the at least one sensing electrode performing the self-capacitive sensing can receive a fixed DC voltage, a ground voltage, a variable AC voltage or a sensing related signal to reduce interference on fingerprint sensing.

36. The capacitive fingerprint sensing method of claim 20, wherein when the capacitive fingerprint sensing apparatus is operated in the mutual-capacitive sensing mode, sensing electrodes around the at least two sensing electrodes performing the mutual-capacitive sensing can receive a fixed DC voltage, a ground voltage, a variable AC voltage or a sensing related signal to reduce interference on fingerprint sensing.

37. The capacitive fingerprint sensing method of claim 20, further comprising a step of:
 selectively switching the capacitive fingerprint sensing apparatus to be operated in the self-capacitive sensing mode or in the mutual-capacitive sensing mode.

38. The capacitive fingerprint sensing method of claim 37, wherein before the step (c) is performed, the capacitive fingerprint sensing method further comprises a step of:
 amplifying the first fingerprint sensing signal and the second fingerprint sensing signal.

* * * * *